(No Model.) 4 Sheets—Sheet 2.

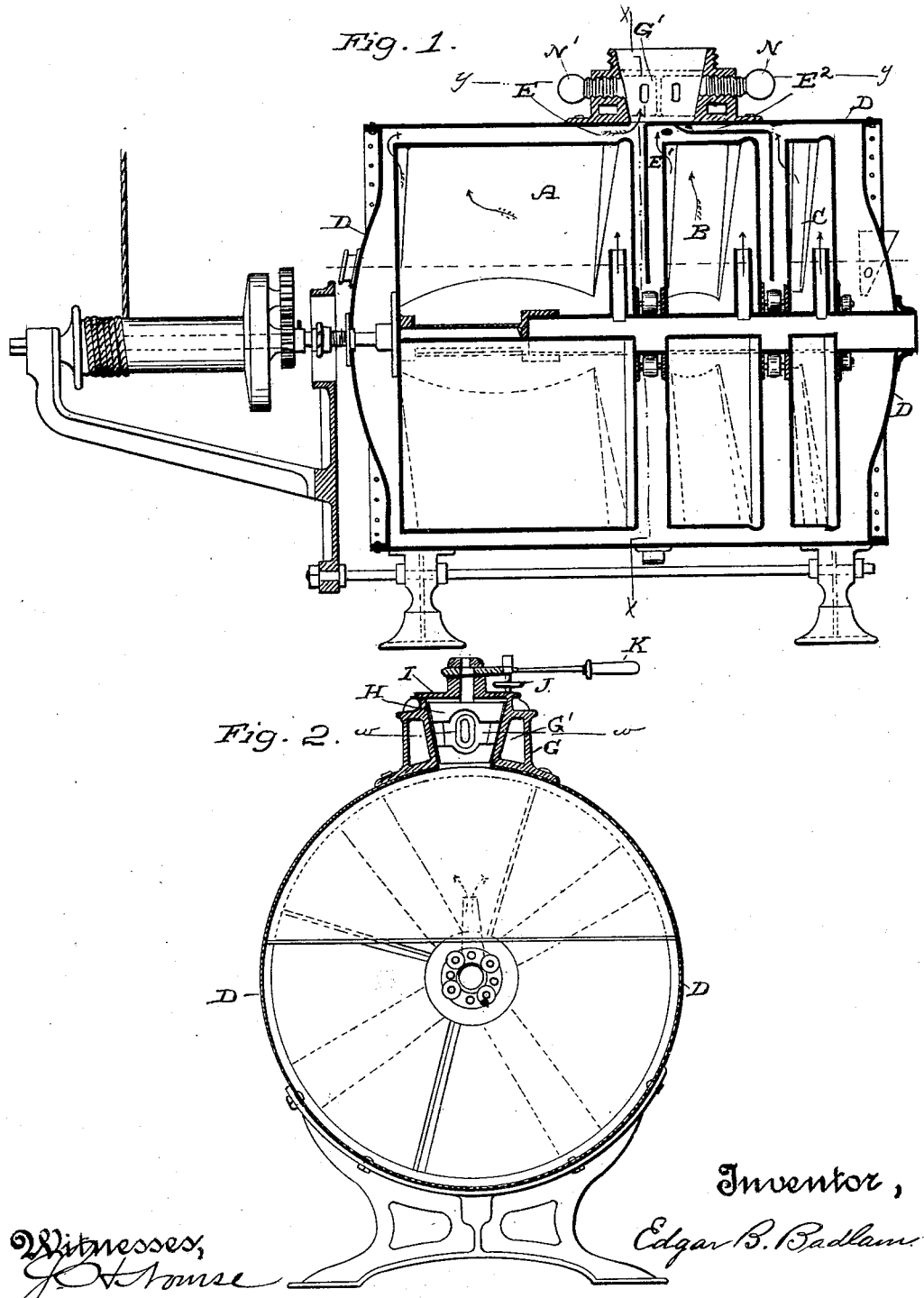

E. B. BADLAM.
AIR SUPPLYING DEVICE FOR GAS MACHINES.

No. 479,238. Patented July 19, 1892.

Witnesses,
J. H. Rouse
J. A. Bayless

Inventor,
Edgar B. Badlam.

(No Model.) 4 Sheets—Sheet 3.
E. B. BADLAM.
AIR SUPPLYING DEVICE FOR GAS MACHINES.

No. 479,238. Patented July 19, 1892.

Witnesses
J. Rourse
J. A. Bayless

Inventor,
Edgar B. Badlam.

(No Model.)  4 Sheets—Sheet 4.

E. B. BADLAM.
AIR SUPPLYING DEVICE FOR GAS MACHINES.

No. 479,238.  Patented July 19, 1892.

WITNESSES
Thomas J. Rout. Jr.
Chapman W. Fowler.

INVENTOR
Edgar B. Badlam,
By Dewey & Co
Attorneys

UNITED STATES PATENT OFFICE.

EDGAR B. BADLAM, OF SAN FRANCISCO, CALIFORNIA.

AIR-SUPPLYING DEVICE FOR GAS-MACHINES.

SPECIFICATION forming part of Letters Patent No. 479,238, dated July 19, 1892.

Application filed December 4, 1891. Serial No. 414,068. (No model.)

*To all whom it may concern:*

Be it known that I, EDGAR B. BADLAM, a citizen of the United States, residing in the city and county of San Francisco, State of California, have invented an Improvement in Air-Supplying Devices for Gas-Machines; and I hereby declare the following to be a full, clear, and exact description of the same.

My invention relates to a machine for proportioning mixtures of air and hydrocarbon vapor and is employed in conjunction with machines in which inflammable vapor or gas is produced by passing air through a volatile hydrocarbon, this vapor when mixed with a proper quantity of atmospheric air being suitable for illuminating purposes.

The object of my invention is to provide an apparatus by which a variable amount of air may be accurately supplied to the carbureter and another volume simultaneously mixed with the vapor after it has been produced in the primary portion of the apparatus.

Figure 3:
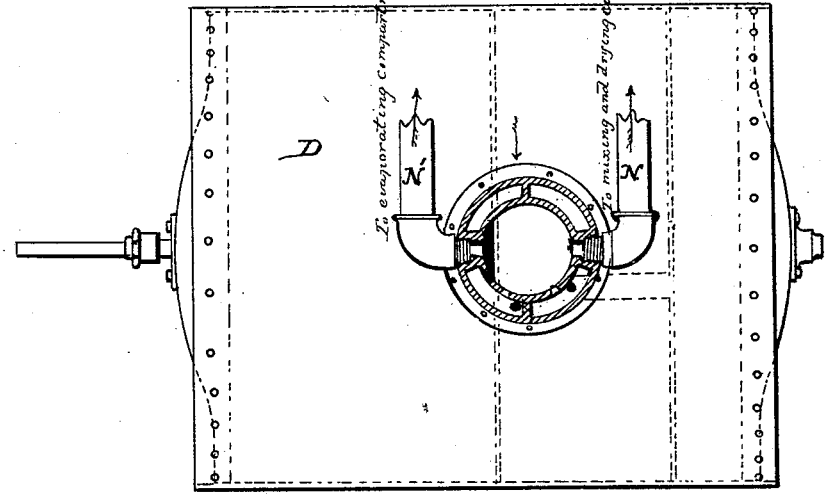
Figure 5:
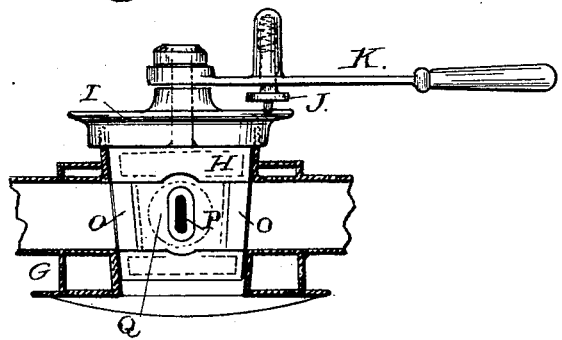
Figure 14:
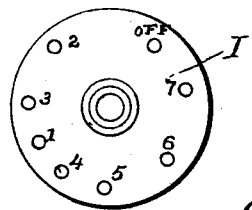
Figure 6:
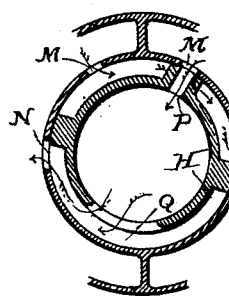
Figure 7:
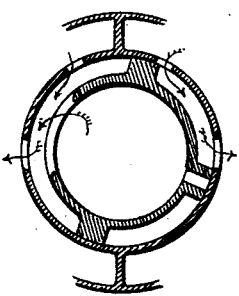
Figure 8:
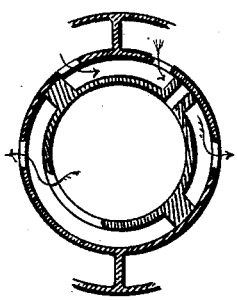
Figure 9:
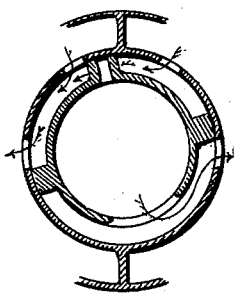
Figure 10:
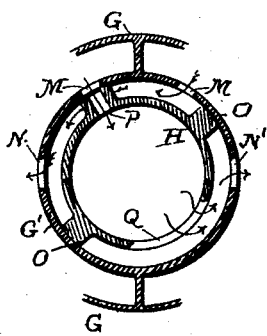
Figure 11:
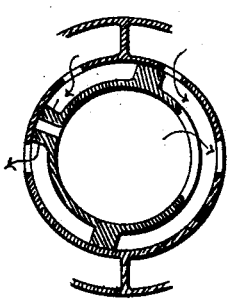
Figure 12:
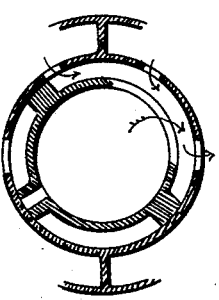
Figure 13:
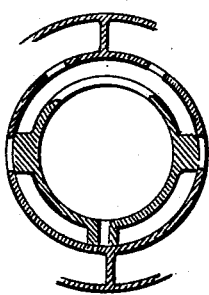
Figure 4:
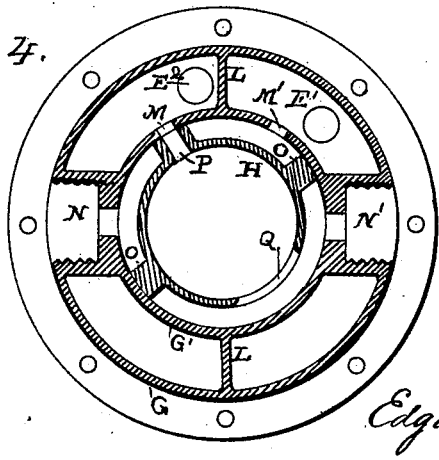
Figure 15:
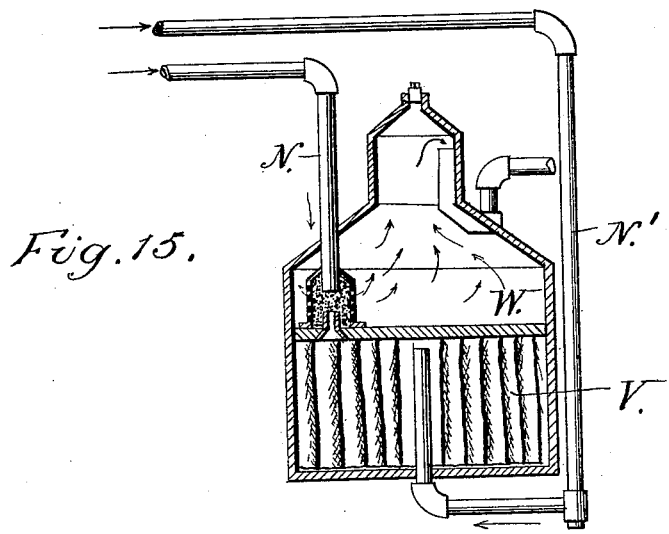
Figure 16:
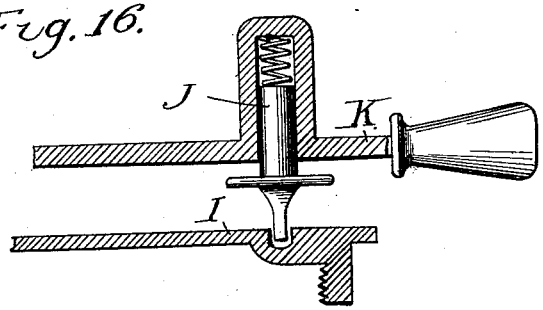

Referring to the accompanying drawings for a more complete explanation of my invention, Figure 1 is a longitudinal section view, partially in elevation, of an air-supplying machine embodying my invention. Fig. 2 is a cross-sectional view on the line $x\,x$ of Fig. 1. Fig. 3 is a horizontal sectional view on the line $y\,y$ of Fig. 1. Fig. 4 is an enlarged sectional view on the line $w\,w$ of Fig. 2. Fig. 5 is a side elevation of the dial or plate I and the handle and spring-pin and showing in section the casing G G'. Figs. 6 to 13, inclusive, illustrate the different positions of the plug H. Fig. 14 is a top plan view of the dial or plate I. Fig. 15 is a sectional view showing the independent mixing and drying compartment and evaporating compartment, to which the pipes N and N' lead. Fig. 16 is an enlarged detail showing the spring-actuated pin J.

The air-forcing mechanism is similar in construction to that shown in my former patent of November 5, 1889, No. 414,276. In the present case I have shown but three air-forcing wheels A, B, and C, contained within an outer casing D. These wheels are rotated by suitable mechanism driven from any convenient source of power, and the air-currents from these wheels are led through openings E, E', and E² into the various passages of the valve and its casing, as will be hereinafter more fully explained.

Within the casing G G' is fitted the plug or valve H, and upon the top is a dial or cover I, having holes around the periphery for the reception of a stop-pin J. This pin projects downwardly from a handle K, which extends radially from the shaft or central stem of the plug, and when the handle is turned in either direction the plug is turned with it. The holes in the dial-plate upon the top are so arranged with reference to the various ports in the valve-casing and plug that when the handle is turned so that the stop-pin drops into either of these holes the plug will stand in position to allow air to pass in from one or more of the air-forcing wheels, and thence through the discharge-passages, to be hereinafter described. The pin J is preferably pressed down by a spring, which insures its entering a hole promptly when it arrives in line with it. The pin has a flange or projection by which it may be withdrawn from any hole when it is desired to turn the plug to another point.

The valve-casing consists of an exterior cylindrical shell G and an interior cylindrical shell G' concentric with the exterior one, having an annular space between the two. This space is divided into two separate chambers by the two oppositely-arranged radial diaphragms L, and the two chambers are crossed by the discharge-passages N and N', which open through the shell G' and into the interior, within which the plug or valve H turns. This valve is made with a central space and an annular space or chamber between the inner ring G' of the valve-chamber and the periphery of the valve. Radial diaphragms O divide this annular space exterior to the valve into two chambers, and by means of passages M or M', passing through the wall G' of the valve-casing, these chambers may be united with the annular chambers between the inner and outer shells of the casings G and G'.

P is a passage extending through the wall of the plug or valve H, so that when brought in line with one of the passages M or M' there will be direct communication by that passage to the interior of the valve.

Q is an opening made in the side of the shell H of the valve, through which communication may be had between the interior of the valve and the adjacent chamber between the diaphragms O. It will be manifest that by turning this valve into different positions within the valve-casing the interior of the valve may be connected with either of the passages M or M' through the opening P or the discharge-openings N N' in the wall of the casing G', and by turning the valve so that the chambers exterior to it and between the diaphragms O are made to connect with either of the passages M or M' in the wall G communication may be had between the outer and inner annular chambers, and thence with the passages E' and E², connecting, respectively, with the air-forcing wheels B and C, while the interior of the valve connects through its passage with the port from the wheel A by E. The dial I has holes around its periphery made to correspond with the various positions of the plug by which these passages are made to communicate, and by turning the valve or plug within the casing into the positions shown in Figs. 6 to 13 any requisite proportion of air may be delivered to the pipe N', and thence to the evaporating-compartment V or to the mixing and drying compartment W through pipe N. (See Fig. 15.) Thus the total output of the wheels represented by A, B, and C may be represented by four plus two plus one equals seven. By these different positions of the valve the whole amount may be divided so that one foot may pass through the passage N' to the evaporating-chamber and four and two (equaling six) may pass through the passage N to the mixing-compartment, Fig. 6. Two may pass through the passage N' and four and one through the passage N, Fig. 7; two plus one through the passage N' and four through the passage N, Fig. 8; four through the passage N' and two plus one through N, Fig. 9; four plus one through N' and two through N, Fig. 10; four plus two through N' and one through N, Fig. 11, or the whole amount four plus two plus one may be made to pass through N' and none pass through N, Fig. 12. The holes in the dial-plate are marked to correspond with these different proportions, and by turning the handle so that it is locked by either of these holes these different proportions of air may be distributed, as the quality of the gas required and the richness of the liquid which is being evaporated may determine. By the use of this valve I am thus enabled accurately to regulate the proportions of air from the air-forcing mechanism and deliver such proportions as may be needed to the evaporator or the mixing-compartment simultaneously.

Having thus described my invention, what I claim as new, and desire to secure by Letters Patent, is—

1. In a gas-machine, the series of air-forcing devices with separate and independent casings, passages leading therefrom, a valve having interior and exterior chambers, a valve-casing consisting of exterior and interior cylindrical walls forming an annular chamber, diaphragms whereby this chamber is divided, openings through the inner cylindrical wall of the casing and openings connecting the interior space in which the valve turns with the pipes N' and N, which lead, respectively, to an evaporating-chamber and an air-mixing chamber, means for turning the valve-plug so as to unite the various chambers and connect them with the air-forcing mechanisms, and a dial-plate whereby each connection is indicated, substantially as herein described.

2. In a gas-machine, a series of air-forcing devices with passages leading therefrom, a valve-casing consisting of concentric walls, openings through the inner wall communicating with the interior space, radial diaphragms by which the space between the walls is subdivided, passages connecting each subdivision with one of the air-forcing devices, a hollow valve-plug fitting and turning in the central compartment having a central passage communicating with the other air-forcing device, chambers around the exterior of the plug with which the openings in the inner wall of the valve-casing connect, a passage Q from one of these chambers to the interior of the plug and an opening P through the opposite wall of the plug to connect with the openings in the casing, and openings N N' through the inner wall of the casing connecting with pipes leading to a mixing and drying compartment and to an evaporating-compartment, substantially as herein described.

3. In a gas-machine, a series of air-forcing devices, independent evaporating and drying compartments, a valve interposed between these compartments and the air-forcing devices, with communicating passages through which varying proportions of air are delivered to the two compartments, a handle by which the valve is turned, a disk having holes or stops corresponding with the different positions of the valve, and a spring-actuated pin passing through the handle so as to engage either of the stops and hold the valve-plug in either position, substantially as herein described.

4. In a gas-machine, a series of air-forcing devices, independent evaporating and drying compartments, a valve interposed between the compartments and the air-forcing mechanisms with passages by which the proportions of air delivered to either compartment are varied by changing the position of the valve-plug, a handle by which the plug is turned, a disk with stops corresponding with the different positions of the plug, a spring-actuated pin carried by the handle so as to engage either of the stops and hold the valve in place, and a projection upon the pin by which it is withdrawn when desired to move the plug, substantially as herein described.

In witness whereof I have hereunto set my hand.

EDGAR B. BADLAM.

Witnesses:
S. H. NOURSE,
J. A. BAYLESS.